Dec. 3, 1963   F. J. FALK   3,112,820
CONTROL LINKAGE
Filed Dec. 22, 1960
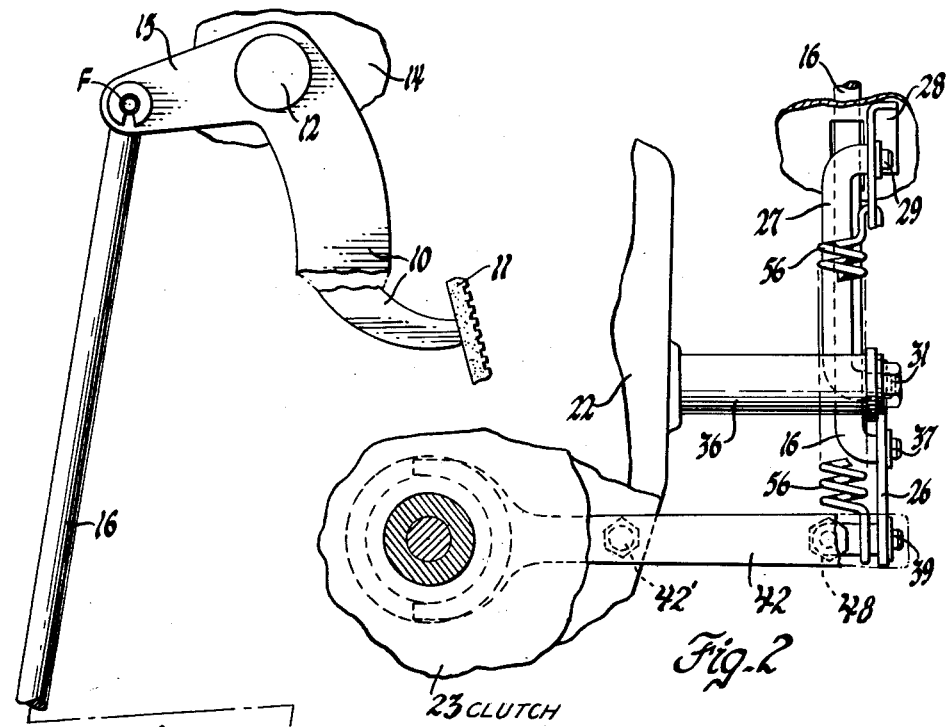
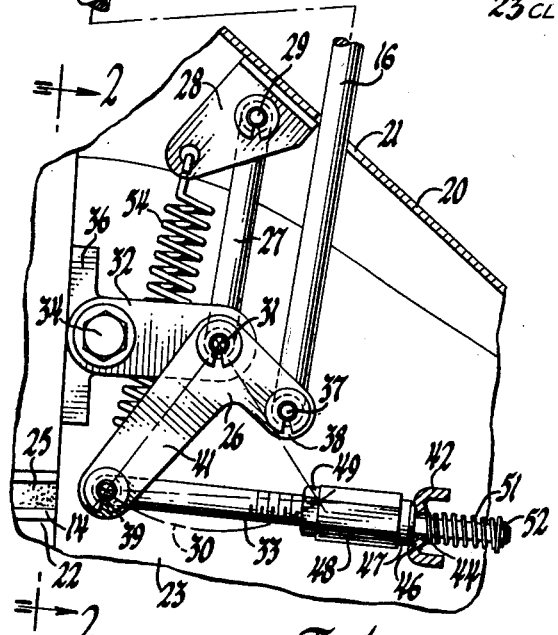
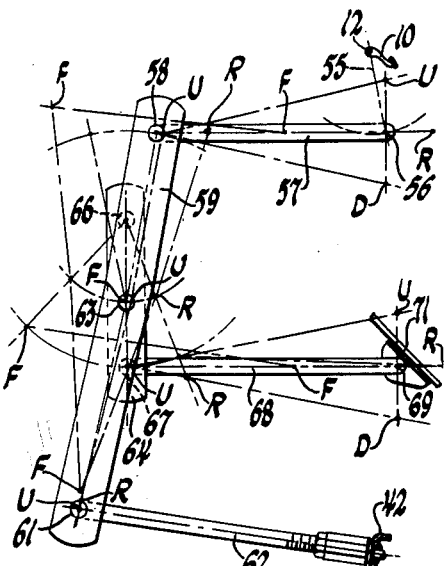
INVENTOR.
Frank J. Falk
BY
A. M. Heiter
ATTORNEY United States Patent Office 3,112,820
Patented Dec. 3, 1963

3,112,820
CONTROL LINKAGE
Frank J. Falk, Pontiac, Mich., assignor to General Motors Corporation, Detroit, Mich., a corporation of Delaware
Filed Dec. 22, 1960, Ser. No. 77,706
14 Claims. (Cl. 192—99)

This invention relates to a control linkage and particularly a clutch control linkage connecting a clutch pedal to a clutch actuating fork.

In automotive vehicles, the clutch pedal is conventionally mounted on the vehicle frame and connected to actuate a clutch operating fork extending from the clutch housing. The clutch is generally formed as a portion of the engine clutch and transmission assembly which is resiliently mounted on the vehicle frame to reduce the objectionable effects of engine vibration. The engine clutch assembly is therefore permitted to move relative to the frame in order to damp the vibration of this assembly. Thus, when the clutch control linkage is directly connected from the vehicle frame to the clutch, movement of the clutch assembly causes movement of the clutch operating fork which would interfere with the proper operation of the clutch control linkage. In order to solve this problem, it is proposed to connect the clutch pedal to the clutch operating fork by a linkage including a floating lever supported by a pivot lever connected to the frame, and a pivot lever connected to the engine clutch assembly so that the bellcrank lever pivot is moved in accordance with the relative movement between the engine clutch assembly and the vehicle frame. The pivot lever connected to the frame extends parallel to a rod connecting the clutch pedal to the floating lever. The pivot lever connected to the clutch extends parallel to the rod connecting the floating lever to the clutch lever. A spring is connected between the frame and a point on the floating lever beyond the floating lever pivot so that the spring resists initial portion of clutch pedal movement and assists the terminal portion of clutch pedal movement.

An object of the invention is to provide in a linkage mechanism connected between two relatively moving members having a controlling element on one member and a controlled element on the other member, and an intermediate member mounted on a pivot point movable in accordance with relative movement between the two members, so that relative movement of the members does not cause relative movement of the controlling and controlled element.

Another object of the invention is to provide in a control linkage supported on two relatively moving members, a connecting lever having a pivot point supported by a lever connected to each of the relatively moving members.

Another object of the invention is to provide in a linkage mechanism connected between two relatively moving members and having a controlling rod connected to a floating lever and a controlled rod connected to the floating lever, a pivot assembly for the bellcrank lever including one lever parallel to one rod connected to one of the members, and another lever parallel to the other rod connected to the other member.

Another object of the invention is to provide in a control linkage connected between a controlling element and controlled element on a pair of relatively movable members, a floating lever, a controlling rod connected to the floating lever, a controlled rod connected to the floating lever, and a support linkage for the pivoted bellcrank lever having one arm extending parallel to the controlling rod and pivotally supported on one member and a second lever supporting the pivot parallel to the controlled lever and supported on the other member.

Another object of the invention is to provide in a control linkage connecting a controlling element mounted on one member to a controlled element mounted on another of a pair of relatively movable members, a floating lever mounted on both members to prevent relative movement of said members causing relative movement of said elements and biasing means acting on said floating lever to resist and assist actuation of the linkage.

These and other objects of the invention will be more apparent from the following description of the preferred embodiment shown in the accompanying drawings.

FIGURE 1 is a schematic view of the assembly and the control linkage.

FIGURE 2 is a partial section of FIGURE 1 on the line 2—2.

FIGURE 3 shows a modified control linkage.

The invention is illustrated in a clutch control linkage in which the clutch pedal lever 10, having a pedal portion 11, is pivotally mounted by pivot 12 on a portion of the vehicle frame 14, and has an actuating arm 15 pivotally connected to the controlling rod 16. The controlling rod 16 extends through a suitable aperture 21 in the vehicle floor 20 which is a portion of the assembled vehicle frame and thus rigid with frame part 14. The engine 22 and clutch 23 is a part of the normal engine clutch and transmission assembly which is resiliently mounted on resilient engine mounts 25 on the vehicle frame to provide relative movement between the engine clutch assembly and the vehicle frame to damp engine vibration and thus moves relative to the frame.

The linkage consists of a floating lever 26, which is pivotally mounted on a pivot lever 27 extending upwardly and parallel to the rod 16 and pivoted by bracket 28 to the floor 20 of the vehicle frame. The lever 27 has at one end an offset pivot 29 fitting in an aperture in the bracket 28, and at the other end an offset pivot 31 extending through an aperture in the floating lever 26. The pivot 31 also provides a pivot for the pivot lever 32, connecting the lever 32 to the floating lever 26. The lever 32 is located parallel to the chord of the arc 30 of movement of pivot 39 of the controlled rod 33 and is pivotally connected by screw 34 to a boss 36 on the engine clutch assembly.

The rod 16 has an offset end portion 37 fitting in a suitable aperture in the arm 38 of floating lever 26 to pivotally connect controlled rod 16 to the floating lever 26. The rod 33 has an offset portion 39 extending through a suitable aperture in the other arm 41 of floating lever 26 to pivotally connect rod 33 to arm 41. The conventional clutch fork operating lever 42 extends outwardly from the clutch 23 where it is pivoted at 42' in a conventional manner to the clutch housing and has an aperture 44 surrounded by a spherical depression 46 in which the spherical seat 47 fits. An elongated nut 48 and a locknut 49 threaded on a threaded portion of rod 33 adjustably positions the spherical seat 47 on the rod. The spring 51 engaging an abutment 52 fixed to the end of rod 33 holds the lever 42 in engagement with the spherical seat 47 to provide a universal pivot connection between the rod 33 and the lever 42. A coil spring 54 is connected between the bracket 28 and the rod 33 at pivot 39 to provide an over-center spring resisting initial movement and assisting final movement.

When the clutch pedal is depressed or moved clockwise from the clutch engaged position, shown in FIGURE 1, to release the clutch, the controlling rod 16 is moved upwardly to rotate floating lever 26 counterclockwise and move controlled rod 33 and clutch fork lever 42 to the right to disengage the clutch. If there is relative movement between the vehicle body and the engine clutch assembly, the linkage will not be significantly affected by this movement to change the relative position between the clutch pedal and the clutch fork lever. Thus relative movement of the clutch and the body will not cause engaging or disengaging movement of the clutch fork. Considering a small increment of relative movement as if the body moved forward, then the pivot points F and 29 would be at new centers forward of the centers shown. The pivot lever 27 due to the forward movement of floor 20 and bracket 28 with the body would move lever 32 and pivot 31 downwardly a small distance on an arc about pivot 34. The rod 16 would move pivot 37 down a slightly greater distance. Since this movement is on an arc about pivot 34 only to the extent that pivot 31 moves down, the additional movement of pivot 37 as compared to the movement of pivot 31 will swing lever 26 clockwise tending to raise pivot 39 and will be on the arc having a small radius about pivot 31 as a center thus increasing the slope of rod 16 toward the original slope and slightly reduce the additional downward movement of pivot 37 of rod 16. Thus this error or downward displacement of the pivots is self-correcting at pivot 39 and pivot 39 is moved a little downward and an insignificant distance forward. When the engine rolls relative to the body, considering the body as moving downwardly, the pivot points F and 29 move downward to new centers. The pivot 31 will move downwardly the same distance along an arc about pivot 34 and the pivot 37 will move downwardly about a similar larger arc about pivot 34 through pivot 37. Since the radius of the arc of movement of pivot 31 is smaller than the radius of the arc of movement of pivot 37, lever 26 will have a slight counterclockwise swinging movement. This will cause the pivot 39 to move down on a similar but very large radius arc. The rod 33, in its mean position of movement between the position shown and the position with pivot 39 moved down due to maximum relative movement of the body relative to the frame and the pivot lever 32 in the position shown, are parallel. Thus, though the pivot point 39 on lever 26 moves on a large radius arc similar to the arc of pivot 31 about 34, and the pivot 39 considered on rod 33 would move on an opposite arc centered at pivot 46—47, assuming no movement of clutch lever 42, the radius of each of these arcs will be aligned at the mid point of relative movement from the old center to the new center and the distances between the arcs are averaged so that no significant movement will be transmitted to the lever 42.

A modified linkage for connecting a clutch pedal 10 and a clutch fork operating lever 42 is shown diagrammatically in FIGURE 3. The clutch pedal 10 is similarly pivoted at 12 to the vehicle frame and has an operating arm 55 pivotally connected at 56 to the control rod 57. The control rod 57 is pivoted at 58 to a floating link 59. The floating lever 59 is pivoted at the other end by pivot 61 to the controlled rod 62 which is connected to the clutch operating fork lever 42 in the same manner as the rod 33 is connected to fork lever 42 in FIGURE 1. The floating lever 59 has a pivot 63 centrally located thereon, pivotally mounting the floating lever to the central portion of pivot lever 64. The upper end of the pivot lever 64 is supported by the pivot 66 on the engine clutch assembly. The lower end of the pivot lever 64 is connected by pivot 67 to a rod 68 pivoted at 69 to the vehicle frame 71.

This linkage will correct for variation in relative position between the body and the engine clutch assembly so that this relative movement does not cause movement of the clutch fork relative to the clutch pedal. If, for example, the body moves upwardly relative to the engine clutch assembly, the pivot 56 would be moved up to the point U immediately thereabove, due to the upward movement of the pivot 12. Similarly, pivot 69 on the body would be moved upwardly to the point U. This would move the pivots 58 and 67 to the right, as indicated by the points U. Since the pivot 67 is moved to the right, while the point 56 is moved to the right, the pivot 66 being stationary, the pivot 63 will also be moved to the right a proportionate distance to the new point U to substantially permit lever 59 to pivot about pivot 61. The control rod 62 can swing about the fork lever 42 with pivot 61 moving in an arc to correct for any inaccuracy. There will be no noticeable movement of the fork lever, since the upward movement to the point U, for the insignificant small distance involved, is substantially coincident with the arc of movement of pivot 61 about the connection of lever rod 62 to fork 42. On downward movement of the body, the pivots 56 and 69 move to the points D. The pivot points 58, 63 and 67 move to the right to the same points U and, similarly, there is no effect on the relative position of the clutch pedal and the clutch fork.

If the body moves forward relative to the engine clutch assembly, for example, the pivot points 56 and 69 moving respectively to the left to the new points F, this linkage arrangement will likewise correct and prevent any substantial movement of the clutch lever relative to the clutch fork 42. Forward movement of rod 68 will move the pivot 67 forward to the new point F rotating lever 64 about pivot 66 and moving pivot 63 to the new point F. With the pivot 56 moved forward to its new point F, the pivot 58 will assume a new point F to its left. This will move the pivot point 61 upwardly substantially on the arc of pivot point 61 about lever 42 and will not create any substantial change in length of the linkage between the clutch lever and the clutch fork. Similarly, movement of the pivot 69 rearwardly to the point R will move the pivot 67 to the new point R, swinging lever 64 counterclockwise about pivot 66 to move the pivot 63 to the new point R. At the same time, pivot 56 moving toward the new point R to the right will move pivot 58 to the new point R, which will raise pivot 61 substantially on the arc of movement of lever 62 about lever 42 to a new point R. Thus the overall length of the linkage is not substantially changed and the relative movement between the clutch housing and the body does not interefere with the operation of the clutch linkage by jiggling the clutch pedal or jiggling the clutch fork.

The above described preferred embodiments of the invention are illustrated in conventional locations in an automotive vehicle, and it will be appreciated that the clutch linkage mechanism may be connected in any direction, vertical and/or horizontal. Reference to these directions in the above specification is merely for clarity in connection with the description of these preferred embodiments and that therefore the description of these linkages is not intended to limit the invention which may be modified within the scope of the appended claims.

I claim:

1. In a control linkage mechanism; a support; a clutch resiliently mounted on said support for limited vibration damping movement having a clutch actuating lever; an operating lever pivotally mounted on said support to receive operating force; a floating lever; means connecting said operating lever to said floating lever; means connecting said floating lever to operate said clutch actuating lever; means to support said floating lever jointly on said support and clutch to move said floating lever in response to relative movement of said support and clutch so that relative movement of said support and clutch does not cause relative movement of said operating lever and clutch lever, and biasing means connected to said support and said floating lever operative in one range of movement to resist movement and in another range of movement to assist movement.

2. In a control linkage mechanism; a support; a clutch resiliently mounted on said support for limited vibration damping movement having a clutch actuating lever; an operating lever pivotally mounted on said support to receive operating force; a floating lever; means connecting said operating lever to said floating lever; means connecting said floating lever to operate said clutch actuating lever; means to pivotally support at a floating pivot said floating lever jointly on said support and clutch to move said floating lever in response to relative movement of said support and clutch so that relative movement of said support and clutch does not cause relative movement of said operating lever and clutch lever, and biasing means connected to said support and said floating lever to, in a mean position, be in alignment with said floating pivot and operative in one range of movement on one side of said mean position to resist movement and in another range of movement on the other side of said mean position to assist movement.

3. In a control linkage mechanism; a support; a clutch resiliently mounted on said support for limited vibration damping movement having a clutch actuating lever; an operating lever pivotally mounted on said support to receive operating force; a floating lever having a pivot point; means connecting said operating lever to said floating lever; means connecting said floating lever to operate said clutch actuating lever; means to pivotally support said floating lever at said pivot point jointly on said support and clutch to move said floating lever in response to relative movement of said support and clutch so that relative movement of said support and clutch does not cause relative movement of said operating lever and clutch lever, and biasing means connected at an anchor point on one side to said support of said floating lever pivot point and to said floating lever at an anchor point on the opposite side of said floating lever pivot point with said three points in alignment in the mean position of said floating lever and operative in one range of movement to resist movement and in another range of movement to assist movement.

4. In a control linkage mechanism; a support; a clutch resiliently mounted on said support for limited vibration damping movement having a clutch actuating lever; an operating lever pivotally mounted on said support to receive operating force; a floating lever; means to pivotally support said floating lever jointly on said support and clutch to rotate said floating lever in response to relative movement of said support and clutch so that relative movement of said support and clutch does not cause relative movement of said operating lever and clutch lever, means connecting said operating lever to said floating lever and said floating lever to said actuating lever to move said floating lever through one and then another range of movement to move the clutch from the engaged to the disengaged position; and biasing means connected to said support and said floating lever operative in one range of movement to resist movement and in another range of movement to assist movement.

5. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever, a first rod pivoted to said floating lever and connected to said operating lever, a second rod pivoted to said floating lever and pivotally connected to said clutch lever, a first pivotal lever extending substantially parallel to said first rod pivoted to said floating lever and to said support, a second pivotal lever pivoted to said floating lever and to said clutch, and said second pivotal lever in one extreme position of the movement due to the limited movement of said clutch and said support being parallel to said second rod in its mean position of the movement due to the limited movement of said clutch and said support.

6. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever, a first rod pivoted to said floating lever and connected to said operating lever, a second rod pivoted to said floating lever and pivotally connected to said clutch lever, a first pivotal lever extending parallel to said first rod pivoted to said floating lever and to said support, a second pivotal lever pivoted to said floating lever and to said clutch, and said second pivotal lever in one extreme position of the movement due to the limited movement of said clutch and said support being parallel to said second rod in its mean position of the movement due to the limited movement of said clutch and said support.

7. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever, a first rod pivoted to said floating lever and connected to said operating lever, a second rod pivoted to said floating lever and pivotally connected to said clutch lever, a first pivotal lever extending in the same direction from said floating lever and parallel to said first rod pivotal to said floating lever and to said support, a second pivotal lever extending in the opposite direction from said floating lever pivoted to said floating lever and to said clutch, and said second pivotal lever in one extreme position of the movement due to the limited movement of said clutch and said support being parallel to said second rod in its mean position of the movement due to the limited movement of said clutch and said support.

8. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever, a first rod pivoted to said floating lever and connected to said operating lever, a second rod pivoted to said floating lever and pivotally connected to said clutch lever, a first pivotal lever extending parallel to said first rod pivoted to said floating lever and to said support, a second pivotal lever pivoted to said floating lever and to said clutch, said second pivotal lever in one extreme position of the movement due to the limited movement of said clutch and said support being parallel to said second rod in its mean position of the movement due to the limited movement of said clutch and said support, and biasing means connected between said support and said floating lever to resist and assist movement of said floating lever.

9. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever having a support pivot, a first rod pivoted to said floating lever and connected to said opertaing lever, a second rod pivoted to said floating lever and pivotally connected to said clutch lever, a first pivotal lever extending substantially parallel to said first rod pivoted to said support pivot of said floating lever and to said support, a second pivotal lever extending substantially parallel to said second rod pivoted to said support pivot of said floating lever and to said clutch, and a spring connected to said support and extending past said support pivot and connected to said floating lever to resist and assist movement of said floating lever about said support pivot.

10. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever having a support pivot, means connecting said operating lever to said floating lever including a first rod pivoted to said floating lever, and means connecting said floating lever to said clutch lever including a second rod pivoted to said floating lever and said clutch lever, a first pivotal lever extending substantially parallel to said first rod pivoted to said support pivot of said floating lever and to said support, a second pivotal lever extending substantially parallel to said second rod pivoted to said support pivot of said floating lever and to said clutch, a a spring connected to said support and extending past said support pivot and connected to said floating lever to resist and assist movement of said floating lever about said support pivot.

11. In a control linkage mechanism; a support; a clutch resiliently mounted on said support for limited vibration damping movement having a clutch actuating lever; an operating lever pivotally mounted on said support; a linkage connecting said operating lever to said clutch lever including a floating lever having a support pivot, a first rod pivoted to said floating lever and connected to said operating lever, a second rod pivoted to said floating lever and pivotally connected to said clutch lever, a first pivotal lever extending substantially parallel to said first rod pivoted to said support pivot of said floating lever and to said support, a second pivotal lever extending substantially parallel to said second rod pivoted to said support pivot of said floating lever and to said clutch, and a spring connected to said support at an anchor point and extending past said support pivot and connected to said floating lever at an anchor point with said anchor points and said support pivot in alignment in a mean position of said floating lever during operating movement to resist and assist movement of said floating lever about said support pivot.

12. In a clutch control mechanism, a vehicle support including a floor and an upper support portion above the floor and a lower support portion below the floor, a depending pedal pivotally mounted on said upper support portion, a clutch resiliently mounted on said lower support portion having a clutch actuating lever extending from said clutch and pivoted for movement in a plane, a floating lever located beneath said floor and having a pivot, a first rod extending downwardly from said depending pedal through said floor to said floating lever and pivoted at said upper end to said depending pedal at a point spaced from the pivot of said depending pedal and pivoted to said floating lever at a point spaced from said pivot of said floating lever, a second rod extending in said plane from said floating lever to said actuating lever pivoted to said floating lever at a point spaced from said pivot of said floating lever and pivoted to said actuating lever at a point spaced from the pivot of said actauting lever, a first support lever pivoted to said clutch and said pivot of said floating lever, and a second support lever pivoted to said lower support portion and to said pivot of said floating lever and being substantially perpendicular to said first support lever.

13. In a clutch control mechanism, a vehicle support including a floor and an upper support portion above the floor and a lower support portion below the floor, a depending pedal pivotally mounted on said upper support portion, a clutch resiliently mounted on said lower support portion having a clutch actuating lever extending from said clutch and pivoted for movement in a horizontal plane, a floating lever located beneath said floor and having a pivot, a first rod extending downwardly from said depending pedal through said floor to said floating lever and pivoted at said upper end to said depending pedal at a point spaced from the pivot of said depending pedal and pivoted to said floating lever at a point spaced from said pivot of said floating lever, a second rod extending horizontally from said floating lever to said actuating lever pivoted to said floating lever at a point spaced from said pivot of said floating lever and pivoted to said actuating lever at a point spaced from the pivot of said actuating lever, a first support lever pivoted to said clutch and said pivot of said floating lever and extending horizontally, and a second support lever pivoted to said lower support portion and to said pivot of said floating lever and extending parallel to said first rod.

14. In a control linkage mechanism; a support having a mounting pivot; a mechanism resiliently mounted on said support for limited vibration damping movement relative to said support and having an actuating lever and a mounting pivot; an operating lever pivotally mounted on said support to receive operating forces; a floating lever having a support pivot and connecting pivot means including first and second pivot means and being spaced from said support pivot; means including an actuating connecting lever having a pivotal connection at said first piovt means to said floating lever and a pivotal connection to said actuating lever; means including an operating connecting lever pivotally connecting said floating lever at said second pivot means and pivotally connected to said operating lever; means pivotally supporting said floating lever at said support pivot, including a first and second support lever at least one of which is materially shorter than one of said operating connecting lever and said actuating connecting lever, said first and second support levers being pivoted to each other at an angle at a common pivot and pivoted respectively by said mounting pivots to said support and said mechanism so that relative movement of said support and mechanism swings one support lever about its mounting pivot for movement of said support pivot in an arc of movement due to relative movement of said mechanism and support having greater curvature and being of less chordal length than the curvature and chordal length would be if said support levers were as long as said actuating connecting lever and operating connecting lever and operative in cooperation with said operating connecting lever to swing said floating lever for providing movement of said first pivot means between said floating lever and said actuating connecting lever in an arc of movement having less curvature and less chordal length than the arc of movement of said support pivot.

References Cited in the file of this patent

UNITED STATES PATENTS

| | | |
|---|---|---|
| 1,954,234 | Zimmerman | Apr. 10, 1934 |
| 2,170,171 | Wemp | Aug. 22, 1939 |
| 2,296,535 | Nutt | Sept. 22, 1942 |
| 2,882,744 | Keller | Apr. 21, 1959 |